United States Patent Office 3,217,381
Patented Nov. 16, 1965

3,217,381
METHOD OF CAPACITOR MANUFACTURE
Bernard Wessling, Winthrop, Mass., assignor to Cornell-Dubilier Electric Corporation, a corporation of Delaware
No Drawing. Filed June 12, 1962, Ser. No. 201,894
16 Claims. (Cl. 29—25.31)

The present invention relates to so-called solid or dry electrolytic capacitors.

Capacitors of this type comprise an anode of a metal that can be formed anodically in an oxygen-supplying solution, particularly tantalum, niobium and alloys of tantalum and niobium, such metals being called "film-forming" metals. Porous anodes of certain film-forming metals may be made by sintering the metal powder with a volatile binder so as to produce an anode body of interconnected metal particles having a vast number of tiny voids communicating to the exterior of the body and having a greatly extended surface area compared to a solid anode of the same volume. Extended-surface anodes incorporating many small voids can also be made with packed fine wire or mesh and, to a lesser degree, with metal foil. The present invention is particularly effective with capacitors having sintered-tantalum anodes, but it also has broader application to porous anodes of other film-forming metals and, more generally, to capacitors having anodes of film-forming metals.

Solid or dry electrolytic capacitors include an anode of a film-forming metal, a formed dielectric film on the anode, an "electrolyte" in the form of a semiconductor on the formed film, and a conductive connection or cathode on the semiconductor. The semiconductor has heretofore been commonly applied to porous tantalum anodes by impregnating and coating the formed anode with manganese nitrate solution and then pyrolytically decomposing the manganese nitrate into semiconductive manganese oxide. This oxide is considered to be largely $MnO_2$, containing a small percentage of $MnO$. It has been found necessary to recycle the steps of impregnation and pyrolytic treatment to build up the desired bulk of manganese oxide.

The foregoing method of applying semiconductive oxide has been used commercially with a large degree of uncertainty, commonly yielding a high percentage of rejected units and units having marginally useful electrical characteristics. Various compromises have been attempted for improving some operating characteristics of the capacitors, with the result that other characteristics suffer deterioration. As an example, it is desirable to achieve a lare value of capacitance from an anode of given size. Using only a few cycles of impregnation with manganese nitrate and pyrolytic decomposition of the manganese nitrate, the capacitance remains low. As the number of impregnation and firing cycles is increased, the capacitance rises, but other characteristics start to deteriorate. There is an increase in leakage current which is another way of saying the safe operating voltage is reduced. As another compromise, the anodically formed oxide could be made thicker by prolonged anodic forming treatment at higher forming voltages in an effort to forestall the deterioration in rated voltage of a unit that results from the recycled pyrolytic treatments. However this increases the dissipation factor of the unit, and it also reduces the capacitance attainable with any given anode.

An object of the present invention resides in a novel method of forming semiconductive oxides on formed anodes in the manufacture of solid or dry electrolytic capacitors.

A further object is to provide a new and improved method of depositing manganese oxide as a semiconductor in and on porous formed anodes. A related object is to provide a novel method of providing formed anodes with a semiconductive oxide, in a manner that is compatible with utilization of thin formed oxide films, thereby to increase the capacitance that is realized with a given anode. A further related object of the invention is to minimize the deterioration of the operating characteristics of capacitors of the foregoing type that occurs incidental to the application of semiconductive oxide.

An additional object resides in a method of depositing manganese oxide as a semiconductor in and on porous anodically formed anodes without unduly limiting the number of cycles of treatment that may be desired. A related object resides in an improvement in the methods used in application of semiconductive oxides, particularly manganese oxide, so as to approach closely the maximum capacitance theoretically attainable with a given anode having a given voltage rating. A corresponding object resides in reducing the size of a capacitor of this type that is needed for providing a given amount of capacitance. A related object resides in improved methods of applying semiconductive manganese oxide to anodically formed anodes for enabling thinner films to be used successfully, and correspondingly increasing the capacitance attainable with a given anode.

A further object of the invention resides in increasing the yield of good units obtained in producing porous-anode tantalum capacitors having semiconductive manganese oxide on the formed anode film, in more economical utilization of costly tantalum through drastic reduction in the percentage of rejected units and through an increase in the capacitance attained with a given anode; and increasing the operating voltage of such capacitors.

Dry tantalum capacitors have been considered superior for use at low temperatures. Commonly they have a dissipation factor of 4 to 6% at 25° C., which degrades to 8 to 10% at minus 55° C.; and they are not normally useful below that temperature as a practical matter. The novel tantalum capacitors have a lower dissipation factor at 25° C., typically being less than 3% and commonly no more than 2%. Unexpectedly this drops to only 1% at minus 55° C., and to ½% at minus 80° C. Furthermore, there is a remarkably small loss of capacitance at low temperatures with the novel capacitors. For example, a novel dry tantalum capacitor that has a capacitance of 1.13 microfarads at 25° C. retains a capacitance of 1.03 microfarads at minus 55° C.

Accordingly, a further object resides in the provision of novel capacitors having improved operating characteristics, notably at low temperatures, and having an increased ratio of capacitance to size of anode.

Generally, the invention makes available a novel method of producing solid electrolytic capacitors having film-forming anodes, specifically sintered porous tantalum-anode capacitors, having semiconducting manganese oxide on the formed anode film. Through this method, it becomes possible to produce more compact units, and capacitors having higher operating voltage, and to effect a drastic reduction in waste through reduction of reject units. Furthermore, the method aids in realizing other desirable properties of high leakage resistance and low dissipation factor. Briefly, by means of this invention the heretofore usual step of pyrolytic conversion of manganese nitrate is avoided. The invention provides strong evidence that pyrolytic decomposition of manganese nitrate which has been a standard practice in the manufacture of dry tantalum capacitors was responsible for exposing the formed anode film to oxides of nitrogen at the high temperature needed for pryolytic decomposition of manganese nitrate, and that at such temperatures the decomposition by-products damaged the formed anode films.

The preferred embodiments of the invention are here described in relation to sintered tantalum anodes which are presently most important commercially, it being understood that the invention applies also to other physical forms of anodes and to anodes of other film-forming metals.

In one manufacturing precedure, sintered anodes of tantalum powder having a tantalum wire terminal are anodically formed in any suitable manner. For example, the treatment may be carried out in 0.01% phosphoric acid. The current is not allowed to rise above 35 milliamperes per gram of tantalum (where many anodes are formed together) and the voltage is increased gradually. The maximum forming voltage having been reached, the anodic treatment is continued for a further period of time as the current decays. The formed anodes are then rinsed clear of etectrolyte, and dried. To this point the anode preparation follows customary practice.

Heretofore the usual forming voltage used has been three times the rated capacitor voltage. A forming voltage of only twice the rated voltage has been used successfully in the present method. Thus, where a capacitor having a rating of 35 volts has been made using a maximum of 105 volts for forming, a maximum of 70 volts has been found suitable in making 35-volt electrolytic capacitors with the present method. This change reduces the film thickness. Such reduction in film thickness is important in greatly increasing the capacitance attainable with a given size of anode, and in reducing the dissipation factor.

In following the present method, it is of course appropriate to use higher forming voltages than 70 volts, mentioned by way of comparison to usual practice. However, higher forming voltage yields capacitors having higher operating voltages. The present invention makes possible the production of dry tantalum capacitors on a routine basis having substantially higher voltage ratings than those presently available commercially. Thus, whereas 35 volts is the common maximum rating, and somewhat higher ratings are available from one source, it has been found practical to produce 100-volt units in accordance with the present invention. In making 100-volt units, a 275-volt maximum has been found desirable in forming the anodes.

The next step involves internally filling and externally coating the porous sintered and formed anode with manganese oxide. This is here effected in two phases, the first being recycled repeatedly, and the second being carried out in a separate, later operation. In the first phase, the porous formed anode is impregnated with a soluble manganese salt and an oxidizing reagent for that salt, and the chemical reaction in the thus impregnated anode causes manganese oxide to be deposited in the anode pores. The process is repeated cyclically to build up the bulk of deposited manganese oxide. Thereafter the deposited oxide is converted to its semiconducting state in a firing treatment.

In a specific example, sintered tantalum anodes anodically formed as above are impregnated with a solution having the following composition.

500 cc. 58% aqueous manganese nitrate
400 cc. de-ionized water
100 cc. concentrated nitric acid
15 grams potassium chlorate The solution is prepared by adding the water to the manganous nitrate, followed by nitric acid. After thorough mixing, the potassium chlorate is added and the solution is agitated until the potassium chlorate is in solution. This will be referred to below as a "light dip," used with particular effectiveness in thoroughly coating the internal surfaces of the porous anode.

The anodes are dipped in this solution for 10 minutes, and then baked in air for 30 minutes at 125° C. This dip and bake sequence is repeated about five times, and the anodes are ready for a "heavy dip."

The solution for the heavy dip is made up as follows:

900 cc. 58% aqueous manganous nitrate
100 cc. concentrated nitric acid
15 grams of potassium chlorate The nitric acid is added to the manganous nitrate, and after adding the potassium chlorate the mixture is agitated until the potassium chlorate is dissolved.

The anodes are subjected to about five cycles treatment each including a 10-minute dip in the above "heavy dip" solution and a 30-minute baking treatment at 150° C.

The "heavy dip" has been found more effective than the "light dip" in building up a coating of manganese oxide on the exposed surfaces of the anodes. The manganese oxide that is chemically deposited is virtually insoluble in water after either dip. However, the "heavy dip" with the higher baking temperature produces a more adherent coating that resists a tendency to be washed away in succeeding dips. The "light dip" is more effective in achieving thorough impregnation of the microscopic internal voids and thorough coating of the surfaces of particles forming such voids.

The porous formed anodes bearing manganese dioxide chemically deposited as above are fired in air at about 325° C. for 10 minutes, by which the manganese oxide is converted to a hard semiconducting state.

In the above process, the tantalum terminal wire that extends from the sintered body may also be coated, and the resulting semiconductive coating might form a current by-pass. In a usual manner, the coating on the wire (or the terminal part of it) may be removed mechanically. The formed film on the anode wire would be damaged in this process, so the coated anodes are then advantageously subjected to anodic forming to re-form the anode wire. The anodes are then thoroughly rinsed, dried, coated with graphite using aquadag, and baked at 125° C. for about 10 minutes, so as to be dry. A conductive coating is next applied to the graphite. This may be done by molten-metal spray techniques, or with conductive epoxy, or by repeated dips in silver paint followed by baking, 125° C. for 30 minutes being suitable. The graphite and the conductive coating form the usual cathode of the capacitor. The unit is then encased in a protective container providing terminal connections to the cathode and the anode wire.

In the "light" and "heavy" dips described above, the potassium chlorate oxidizes the manganese nitrate, but that reaction is extremely slow until the temperature reaches 100° C. Between 100° C. and 125° C., the reaction accelerates, and the solute vaporizes. The manganese dioxide is deposited chemically in situ. Gaseous byproducts of the reaction are given off, leaving the anode voids in condition for renewed impregnation and chemical deposition of manganese dioxide. Both reagents could be applied in alternate dips (first the potassium chlorate and then the manganese nitrate or vice versa) but the solutions containing both reagents as described in detail above are more practical and are preferred.

The nitric acid in the "heavy" and "light" dip solutions is desirable to prolong the life of the solutions. It would be possible to use the above solutions containing both manganese nitrate and potassium chlorate, omitting the nitric acid, but then fresh solutions would often be needed.

In the solutions described above specifically, the potassium chlorate is an oxidizing reagent for the manganous nitrate, for precipitating a coating of manganese oxide in and on the sintered and formed tantalum anode in situ, thoroughly covering the formed film. Other oxidizing reagents are suggested, such as sodium chlorate, potassium perchlorate (but this is extremely hazardous) and chloric acid.

The cyclic dips and baking treatments deposit manganese dioxide on the formed film in the anode interstices and on the outer surface of the anode. This reaction produces gaseous by-products. The reaction occurs at the relatively low baking temperature of 125 to 150° C., in contrast to the relatively high temperature (about 350° C.) previously used in repeated cycles for pyrolytically converting manganous nitrate into the oxide. Judging from the superior electrical characteristics of capacitors processed as above, as compared to capacitors made by pyrolytic decomposition of manganous nitrate, the formed anode film is not appreciably harmed at the low chemical reaction temperatures in the present method but the formed film is badly damaged by oxides of nitrogen that are relased at high temperatures in the pyrolytic decomposition process. Pyrolytic treatment is commonly restricted to about six cycles to avoid severe electrical deterioration, whereas the ten cycles described above using chemical deposition of the manganese dioxide has been found ample and is not limited by deterioration.

The thoroughness of the coating and filling of voids in the sintered and formed anodes that can be produced with the method described above is demonstrated by the following test. A formed anode can be used in a wet capacitor, and its capacitance can be measured. This may be regarded as a theoretical maximum. Dry capacitors formed with pyrolytic decomposition of manganous nitrate fall far short of this wet-capacitor capacitance, typically only 50–70% of the above theoretical maximum. (Greater percentages could be reached with the pyrolytic process, but other electrical properties would suffer.) Formed, sintered anodes that are effectively and thoroughly filled and coated with manganese dioxide chemically deposited in situ in making dry capacitors according to the novel process above, have been found to be virtually equal in capacitance to the theoretical maximum for that anode without suffering deterioration of other characteristics. This means that through use of the present invention a substantially higher value of capacitance can be attained in a dry capacitor with given size of sintered anode, in a high-quality unit.

A further gain in capacitance is realized with the novel method. Because it has proven not to degrade the anodically formed film, it is no longer necessary to use thick anodic films. With thin films there is a gain in capacitance. There is also an improvement in the dissipation factor and there is a significant saving in the time required in carrying out the forming treatment. Additionally, the non-corrosive character of the described treatment makes possible a higher yield of higher quality units. Where 35 volts was considered a practical norm for the rating of pyrolytically treated units and a substantial rejection rate was tolerated, the novel method makes possible virtually 100% yield of units having at least a 35 volt rating, an dyields a high proportion of 50 volt units and even yields a substantial number of 60-volt units.

As indicated above, sintered and formed tantalum anodes as processed above yield capacitors having a distintly lower-than-usual dissipation factor at 25° C., and unexpectedly there is a marked improvement in the dissipation factor at lower temperatures. A novel tantalum capacitor with a dissipation factor of 2% at 25° C. improves to 1% and ½% as the temperature falls to minus 55° C. and minus 80° C., respectively. This contrasts with previous dry tantalum capacitors which suffer an increase in dissipation factor as the temperature drops and as a practical matter they have been limited to use above —55° C.

From the foregoing it is apparent that an important advance in the manufacture of dry electrolytic capacitors has been disclosed. On the basis of this disclosure, various changes will be suggested to those skilled in the art, and consequently this invention should be broadly construed, in a manner consistent with its full spirit and scope.

What I claim is:

1. The method of making tantalum capacitors, including the steps of preparing an anode having a tantalum body whose surface has an anodically formed film, the tantalum body being of a form having a greatly extended surface area compared to a solid of the same volume as said body, depositing manganese dioxide on said formed film as the reaction product of a solution of manganous nitrate and an oxidizing reagent therefor thermally converting the manganese dioxide to a stable semiconducting state, and applying a conductive coating to the semiconducting manganese dioxide.

2. The method of making tantalum capacitors, including the steps of preparing an anode having a tantalum body that incorporates numerous interstices between interconnected portions of metallic tantalum, the body thus providing a greatly extended anode surface and the interstices communicating to the exterior of the body, anodically forming the anode surface, coating said formed body and filling said interstices with manganese dioxide deposited in situ as the reaction product of a solution of manganous nitrate and an oxidizing reagent therefor, thereafter converting the manganese dioxide into a semiconducting state, and applying a conductive connection to the semiconductive manganese oxide.

3. In the method of fabricating a dry electrolytic capacitor having an anode of a film-forming metal and an anodically formed dielectric film thereon, the step of chemically depositing on the anode film a dry electrolyte in situ as an oxide produced in a reaction of the salt of a metal having an oxide that has a semiconductive state and an oxidizing reagent for said salt.

4. In the method of fabricating a dry electrolytic capacitor having an anode of a film-forming metal and an anodically formed dielectric film thereon, the steps of chemically depositing on the anode film a dry electrolyte in situ as an oxide by coating the anode film with a solution of the salt of a metal having an oxide that has a semiconductive state and an oxidizing reagent for said salt and heating said salt and said oxidizing reagent to a temperature substantially below the pyrolytic decomposition temperature of the salt, and thereafter firing the anode to convert the deposited oxide to its semiconductive state.

5. In the method of making dry electrolytic capacitors having an anode of a film-forming metal, a dielectric film covering the anode surface, a semiconductor on said film and a cathode connection to said semiconductor, that improvement in the application of the semiconductor to the anode film which includes the steps of applying a soluble manganese salt and an oxidizing reagent therefore in solution to said surface, heating the anode to deposit manganese dioxide in situ, repeatedly cycling the anode through said applying and heating steps to buid up the amount of deposited manganese dioxide, and firing the anode to convert the manganese dioxide thereon into a semiconducting state.

6. The method in accordance with claim 5, wherein said anode is of tantalum and incorporates numerous interstices between interconnected metallic portions that provide a greatly extended anode surface, the interstices communicating to the exterior, wherein the film on said extended anode surface is coated and said interstices are substantially filled with manganese dioxide by the repeated cycling of the anode as aforesaid.

7. In the method of fabricating tantalum capacitors having a tantalum anode incorporating numerous interstices between interconnected portions of metallic tantalum that provide a greatly extended anode surface, the interstices communicating to the exterior of the body, the anode having a formed film, including the steps of coating said body and filling said interstices with manganese dioxide by coating the anode and saturating said interstices with an aqueous solution of manganous nitrate and an oxidizing reagent therefor, heating the anode to effect chemical deposition of manganese dioxide at a temperature substantially below that required for pyrolytic decomposition of manganous nitrate, and subsequently firing the deposited manganese dioxide into its semiconducting state.

8. In the method of making dry electrolytic capacitors that includes the steps of preparing a tantalum anode of extended surface area covered with an anodically formed film, applying semiconducting manganese oxide to said film and applying a conductive coating to said oxide, that improvement in the application of manganese oxide which includes the steps of cyclically applying to the formed anode an aqueous solution containing manganous nitrate and an oxidizing reagent therefor and heating said solution to effect deposition of manganese dioxide in situ, and firing the anode so as to convert the manganese dioxide to its semiconducting state.

9. The method in accordance with claim 8 wherein said oxidizing reagent is potassium chlorate, wherein said heating is limited to approximately 150° C., and wherein the temperature of said firing step is approximately 350° C.

10. The method of making a dry electrolytic capacitor having a sintered formed-film anode which includes the steps of cyclically impregnating said anode with a dilute aqeous solution of manganous nitrate and potassium chlorate and heating said anode to about 125° C. to effect deposition in situ of manganese dioxide, thereafter cyclically impregnating and coating said anode with a concentrated solution of manganous nitrate and potassium chlorate and heating said anode to about 150° C. to effect deposition in situ of adherent manganese dioxide, and firing the thus impregnated and coated anode at about 325° C. to convert the manganese dioxide into its semiconducting state.

11. The method in accordance with claim 10, wherein said solutions contain a stabilizing proportion of nitric acid.

12. The method of making a dry electrolytic capacitor having a formed-film anode, which includes the steps of cyclically coating said anode with an aqueous solution of manganous nitrate and potassium chlorate and heating the anode to effect deposition of adherent manganese dioxide, and firing the resulting anode to convert the manganese dioxide to its semiconducting state.

13. The method of making a dry electrolytic capacitor having a sintered formed-film tantalum anode, which includes the steps of cyclically impregnating said anode with a solution A and heating the anode to about 125° C. to deposit manganese dioxide in situ, cyclically immersing said anode in a solution B and heating the anode to about 150° C., and firing the resulting anode at about 325° C. for about ten minutes, solution A having approximately the following composition:

500 cc. 58% $Mn(NO_3)_2$ aqueous
400 cc. de-ionized water
100 cc. concentrated nitric acid
15 grams $KClO_3$ and solution B having approximately the following composition:

900 cc. 58% $Mn(NO_3)_2$ aqeous
100 cc. concentrated nitric acid
15 grams $KClO_3$.

14. In the method of fabricating a dry electrolytic capacitor an anode of a film-forming metal and an anodically formed dielectric film thereon, the steps of applying to said film an aqueous solution of the salt of a metal whose oxide has a semiconductive state and an oxidizing reagent for said salt of the group consisting of potassium chlorate, sodium chlorate, potassium perchlorate, and chloric acid, heating the anode to effect deposition in situ of an oxide of the salt but at a temperature below that at which pyrolytic decomposition of the salt occurs and thereafter firing the anode to convert the deposited oxide to its semiconductive state.

15. The method of making a dry electrolytic capacitor having a formed-film anode, which includes the steps of coating said anode with an aqueous solution of manganous nitrate and an oxidizing reagent therefor of the group consisting of potassium chlorate, sodium chlorate, potassium perchlorate, and chloric acid and heating the anode to effect deposition of adherent manganese dioxide, cyclically repeating said coating and heating steps, and firing the resulting anode to convert the manganese dioxide to its semi-conducting state.

16. The method in accordance with claim 8 wherein said oxidizing reagent is of the group consisting of potassium chlorate, sodium chlorate, potassium perchlorate and chloric acid, wherein said heating is limited to approximately 150° C., and wherein the temperature of said firing step is approximately 350° C.

References Cited by the Examiner
UNITED STATES PATENTS

| 2,936,514 | 5/60 | Millard | 29—25.31 |
| 3,123,894 | 3/64 | Von Bonin | 29—25.31 |

RICHARD H. EANES, JR., *Primary Examiner.*